(12) United States Patent
Konkle et al.

(10) Patent No.: US 8,399,847 B2
(45) Date of Patent: Mar. 19, 2013

(54) RUGGEDIZED ENCLOSURE FOR A RADIOGRAPHIC DEVICE

(75) Inventors: Nicholas Ryan Konkle, Waukesha, WI (US); Habib Vafi, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 12/944,535

(22) Filed: Nov. 11, 2010

(65) Prior Publication Data

US 2012/0119098 A1 May 17, 2012

(51) Int. Cl.
*G01T 1/00* (2006.01)
(52) U.S. Cl. .................................. 250/370.09
(58) Field of Classification Search ............. 250/370.08, 250/370.09, 370.11, 580
See application file for complete search history.

(56) References Cited

U.S. PATENT DOCUMENTS

| | | | |
|---|---|---|---|
| 5,198,685 A | 3/1993 | Kitani et al. | |
| 5,474,458 A | 12/1995 | Vafi et al. | |
| 5,736,732 A | 4/1998 | Possin et al. | |
| 5,796,109 A | 8/1998 | Frederick et al. | |
| 5,804,832 A | 9/1998 | Crowell et al. | |
| 6,025,598 A | 2/2000 | Tago | |
| 6,073,343 A | 6/2000 | Petrick et al. | |
| 6,259,098 B1 | 7/2001 | Vafi et al. | |
| 6,457,861 B1 | 10/2002 | Petrick et al. | |
| 6,488,409 B1 | 12/2002 | Vafi et al. | |
| 6,535,576 B2 | 3/2003 | Vafi et al. | |
| 6,548,177 B2 | 4/2003 | Hieda et al. | |
| 6,642,524 B2 | 11/2003 | Vafi et al. | |
| 6,700,126 B2 | 3/2004 | Watanabe | |
| 6,713,769 B2 | 3/2004 | Vafi et al. | |
| 6,718,010 B2 | 4/2004 | Petrick et al. | |
| 6,825,472 B2 | 11/2004 | Endo | |
| 6,946,661 B2 | 9/2005 | Vafi et al. | |
| 6,982,424 B2 | 1/2006 | Vafi et al. | |
| 6,988,899 B2 | 1/2006 | Vafi et al. | |
| 7,015,478 B2 | 3/2006 | Yamamoto | |
| 7,117,588 B2 | 10/2006 | Vafi et al. | |
| 7,239,685 B2 | 7/2007 | Petrick et al. | |
| 7,247,859 B2 | 7/2007 | Murphy et al. | |
| 7,409,564 B2 | 8/2008 | Kump et al. | |
| 7,488,943 B2 | 2/2009 | Rose et al. | |
| 7,488,946 B2 | 2/2009 | Hennessy et al. | |
| 7,495,226 B2 | 2/2009 | Jadrich et al. | |
| 7,495,227 B2 | 2/2009 | Hennessy et al. | |
| 7,593,507 B2 | 9/2009 | Ohta et al. | |
| 7,687,790 B2 | 3/2010 | Utschig et al. | |
| 7,745,797 B1 | 6/2010 | Liu et al. | |
| 7,852,985 B2 | 12/2010 | Liu et al. | |
| 7,873,145 B2 | 1/2011 | Liu et al. | |
| 2004/0114725 A1 | 6/2004 | Yamamoto | |
| 2006/0074287 A1 | 4/2006 | Neumann et al. | |

(Continued)

OTHER PUBLICATIONS

Thales Components & Subsystems, "Pixium Portable 3543," Mar. 2008, Velizy Cedex, France.

(Continued)

*Primary Examiner* — Mark R Gaworecki
(74) *Attorney, Agent, or Firm* — Fletcher Yoder, P.C.

(57) ABSTRACT

In one embodiment, a portable X-ray detector assembly is provided comprising a detector array and a housing for the detector array. The housing is provided as a multi-layer structure in which at least one layer improves or increases the structural integrity of other layers of the housing. In certain embodiments, the structural integrity layer also acts to reduce or eliminate electromagnetic interference that might otherwise affect the detector or other electronics in the vicinity of the detector.

20 Claims, 8 Drawing Sheets

U.S. PATENT DOCUMENTS

| | | |
|---|---|---|
| 2006/0185165 A1 | 8/2006 | Vafi et al. |
| 2008/0078938 A1 | 4/2008 | Vafi et al. |
| 2008/0078940 A1 | 4/2008 | Castleberry et al. |
| 2008/0224056 A1 | 9/2008 | Liu et al. |
| 2008/0240358 A1 | 10/2008 | Utschig et al. |
| 2009/0116431 A1 | 5/2009 | Cadieux |
| 2010/0001195 A1 | 1/2010 | Konkle et al. |
| 2010/0008473 A1 | 1/2010 | Liu et al. |
| 2010/0128850 A1 | 5/2010 | Konkle |
| 2010/0264572 A1 | 10/2010 | Konkle |

OTHER PUBLICATIONS

U.S. Appl. No. 12/630,524, filed Dec. 3, 2009, Konkle.
U.S. Appl. No. 12/630,572, filed Dec. 3, 2009, Konkle.

RUGGEDIZED ENCLOSURE FOR A RADIOGRAPHIC DEVICE

BACKGROUND OF THE INVENTION

The present invention relates to digital imaging systems, and particularly to the enclosure of a digital X-ray detector of such systems.

A number of radiological imaging systems of various designs are known and are presently in use. Such systems generally are based upon generation of X-rays that are directed toward a subject of interest. The X-rays traverse the subject and impact a film or a digital detector. In medical diagnostic contexts, for example, such systems may be used to visualize internal tissues and diagnose patient ailments. In other contexts, parts, baggage, parcels, and other subjects may be imaged to assess their contents and for other purposes.

Increasingly, such X-ray systems use digital circuitry, such as solid-state detectors, for detecting the X-rays, which are attenuated, scattered or absorbed by the intervening structures of the subject. Solid-state detectors may generate electrical signals indicative of the intensities of received X-rays. These signals, in turn, may be acquired and processed to reconstruct images of the subject of interest. As digital X-ray imaging systems have become increasingly widespread, digital X-ray detectors have become more portable for even greater versatility. With the advent of portable digital X-ray detectors comes a need for lighter, thinner, smaller detectors that retain the same imager size but improve upon the ergonomics and durability of the detector. Also, a need exists to protect the fragile detector assembly within the portable detector. Improving upon the design of the detector assembly is necessary to make the detector assembly sturdier and easier to service while reducing the costs of assembling detectors.

BRIEF DESCRIPTION OF THE INVENTION

In accordance with one embodiment, a portable X-ray detector assembly is provided that includes a detector array and a housing that houses the detector array. The housing includes a first layer and a second layer. The first layer of the housing includes a polymer. The second layer of the housing maintains the structural integrity of the first layer in the event of a break in the first layer.

In accordance with another embodiment, a method of manufacturing a portable X-ray detector assembly is provided. The method includes fabricating a housing and situating a detector array within the housing. The housing including a first layer and a second layer. The first layer of the housing includes a polymer. The second layer maintains the structural integrity of the first layer in the event of a break in the first layer.

In accordance with a further embodiment, a housing component for a portable X-ray detector is provided and includes a first layer including a polymer, and a second layer formed on or in the first layer. The first layer maintains the structural integrity of the first layer in the event of a break in the first layer.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed technique, it will be appreciated that these examples are illustrative in nature and that the term "exemplary" is not used herein to denote any preference or requirement with respect to a disclosed aspect or embodiment. Further, any use of the terms "top," "bottom," "above," "below," other positional terms, and variations of these terms is made for convenience, but does not require any particular orientation of the described components.

As discussed herein, portable digital X-ray detectors may be used as part of a radiological imaging system. Lightweight and low cost materials may be used to construct the portable digital X-ray detector for easier transportation and production. One embodiment discussed herein may use a plastic enclosure instead of a metal enclosure so that the portable digital X-ray detector may be lighter and lower cost than it would otherwise be. However, the plastic enclosure may not be able to withstand the same impacts that a metal enclosure could withstand. For example, if a metal enclosure is dropped or impacted by an object, the metal enclosure may become dented but not cracked. Conversely, a plastic enclosure undergoing the same trauma may be cracked or punctured. Such damage to the enclosure of a portable X-ray detector may expose the internal electronics to the external environmental conditions and/or may result in damaged or loose pieces (e.g., fragments) of the enclosure being introduced into the enclosure and potentially damaging the detector electronics.

As discussed herein, to improve durability of such a plastic enclosure, the enclosure may be reinforced with one or more additional layers that strengthen the plastic and/or provide structural support to inhibit dispersion of plastic pieces. This increased sturdiness may provide a lightweight digital X-ray detector, as well as decrease the damage that could occur to plastic enclosures used as part of such detectors.

Figure 1:
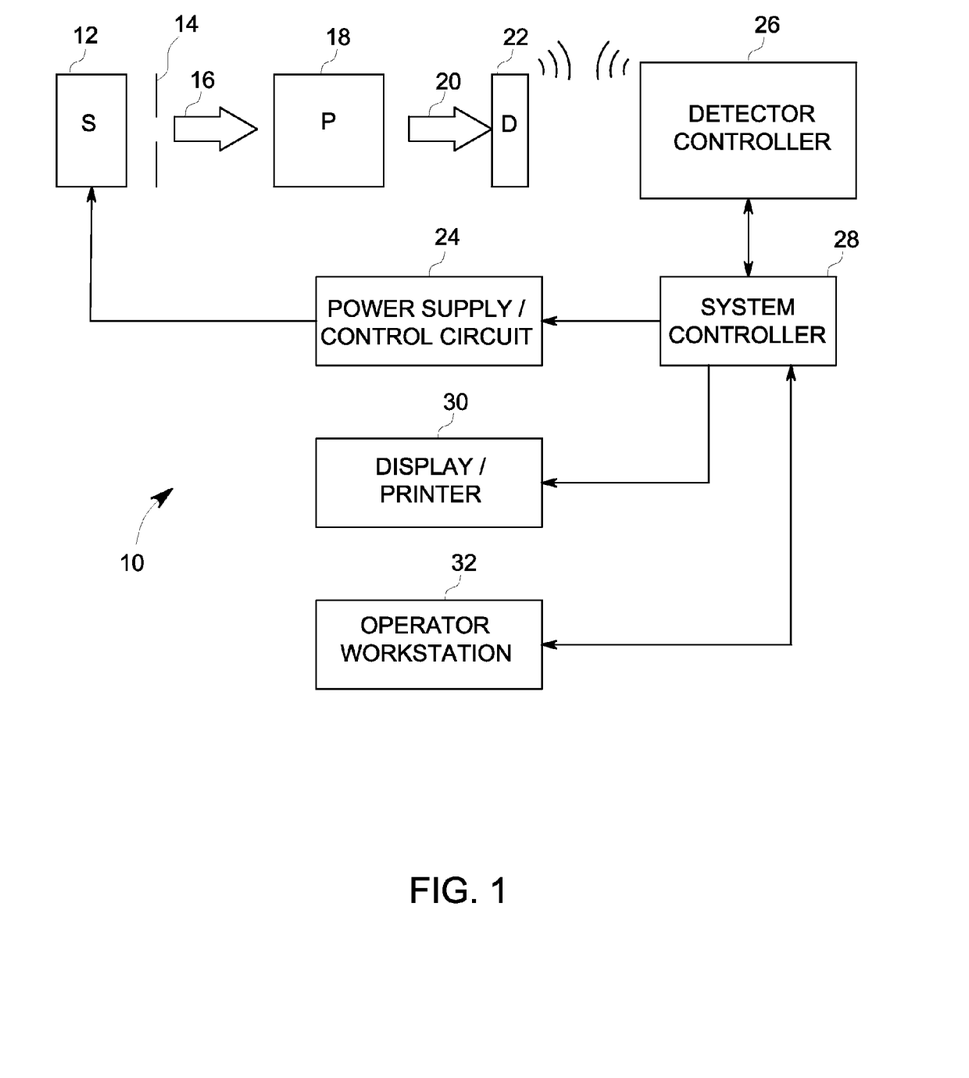
FIG. 1 is a diagrammatical overview of a digital X-ray imaging system in accordance with one or more embodiments of the present disclosure.

With the foregoing comments in mind and turning to FIG. 1, this figure illustrates diagrammatically an imaging system 10 for acquiring and processing discrete pixel image data using a portable detector as discussed herein. In the illustrated embodiment, the imaging system 10 is a digital X-ray system designed both to acquire original image data and to process the image data for display. In the embodiment illustrated in FIG. 1, imaging system 10 includes a source of X-ray radiation 12 positioned adjacent to a collimator 14. The collimator 14 permits a stream of radiation 16 to pass into a region in which an object or subject, such as a patient 18, is positioned. A portion of the radiation 20 passes through or around the subject and impacts a digital X-ray detector, represented generally at reference numeral 22. As will be appreciated by those skilled in the art, the detector 22 may convert the X-ray photons incident on its surface to lower energy photons, and subsequently to electric signals, which are acquired and processed to reconstruct an image of the features within the subject.

The radiation source 12 is controlled by a power supply/control circuit 24 which supplies both power and control signals for examination sequences. Moreover, the detector 22 is communicatively coupled to a detector controller 26 which commands acquisition of the signals generated in the detector 22. In one embodiment, the detector 22 may communicate with the detector controller 26 via a suitable wireless communication standard, although the use of detectors 22 that communicate with the detector controller 26 through a cable or some other wired connection are also envisaged. The detector controller 26 may execute various signal processing and filtration functions, such as for initial adjustment of dynamic ranges, interleaving of digital image data, and so forth.

Both the power supply/control circuit 24 and the detector controller 26 are responsive to signals from a system controller 28. In general, the system controller 28 commands operation of the imaging system 10 to execute examination protocols and to process acquired image data. In the present context, the system controller 28 also includes signal processing circuitry, typically based upon a programmed general purpose or application-specific digital computer; and associated manufactures, such as optical memory devices, magnetic memory devices, or solid-state memory devices, for storing programs and routines executed by a processor of the computer to carry out various functionalities, as well as for storing configuration parameters and image data; interface protocols; and so forth. In one embodiment, a general or special purpose computer system may be provided with hardware, circuitry, firmware, and/or software for performing the functions attributed to one or more of the power supply/control circuit 24, the detector controller 26, and/or the system controller 28 as discussed herein.

In the embodiment illustrated in FIG. 1, the system controller 28 is linked to at least one output device, such as a display or printer as indicated at reference numeral 30. The output device may include standard or special purpose computer monitors and associated processing circuitry. One or more operator workstations 32 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
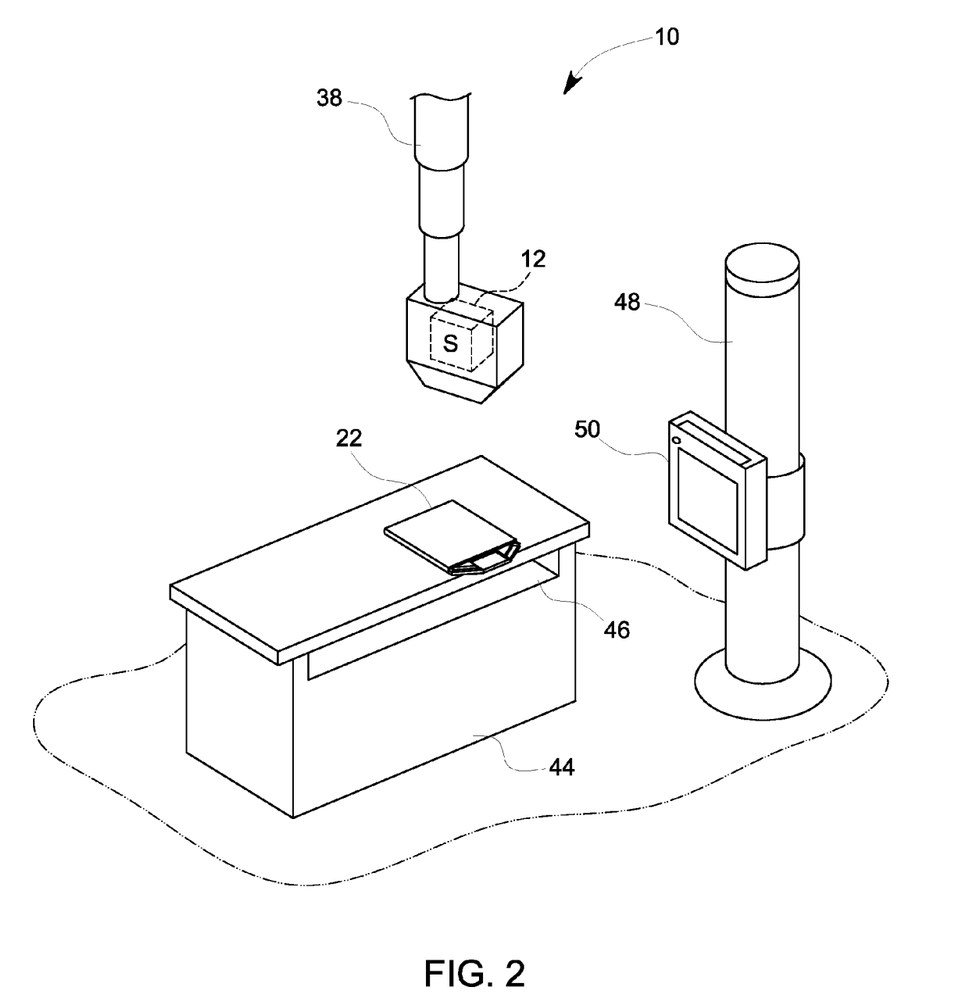
FIG. 2 is a perspective view of an implementation of the digital X-ray imaging system of FIG. 1 in accordance with one embodiment.

By way of further example, a perspective view of an imaging system 10 is provided in FIG. 2 in accordance with one embodiment. The depicted imaging system 10 includes an overhead tube support arm 38 for positioning the radiation source 12, such as an X-ray tube, with respect to the patient 18 and the detector 22. It is also noted that, in addition to the radiation source 12, the imaging system 10 may also include any or all of the other components described above with respect to FIG. 1, such as the system controller 28.

Moreover, in one embodiment, the imaging system 10 may be used with one or both of a patient table 44 and a wall stand 48 to facilitate image acquisition. Particularly, the table 44 and the wall stand 48 may be configured to receive one or more separable and portable digital detectors 22. For instance, the digital detector 22 may be placed on the upper surface of the table 44, and the patient 18 (or an anatomy of interest of the patient 18) may be positioned on the table 44 between the detector 22 and the radiation source 12. In some other instances, the detector 22 may be positioned in a slot 46 below the upper surface of the table 44 and the patient 18, or the radiation source 12 and the detector 22 may be positioned horizontally about the patient 18 for cross-table imaging. Further, the wall stand 48 may include a receiving structure 50 also adapted to receive the digital detector 22, and the patient 18 may be positioned adjacent the wall stand 48 to enable image data to be acquired via the digital detector 22.

In one embodiment, the imaging system 10 may be a stationary system disposed in a fixed X-ray imaging room, such as that generally depicted in, and described above with respect to FIG. 2. It will be appreciated, however, that the presently disclosed techniques may also be employed with other imaging systems, including mobile X-ray units and systems. For instance, in other embodiments, a mobile X-ray unit may be moved to a patient recovery room, an emergency room, a surgical room, or the like to enable imaging of a patient without requiring transport of the patient to a dedicated (i.e., fixed) X-ray imaging room.

Figure 3:
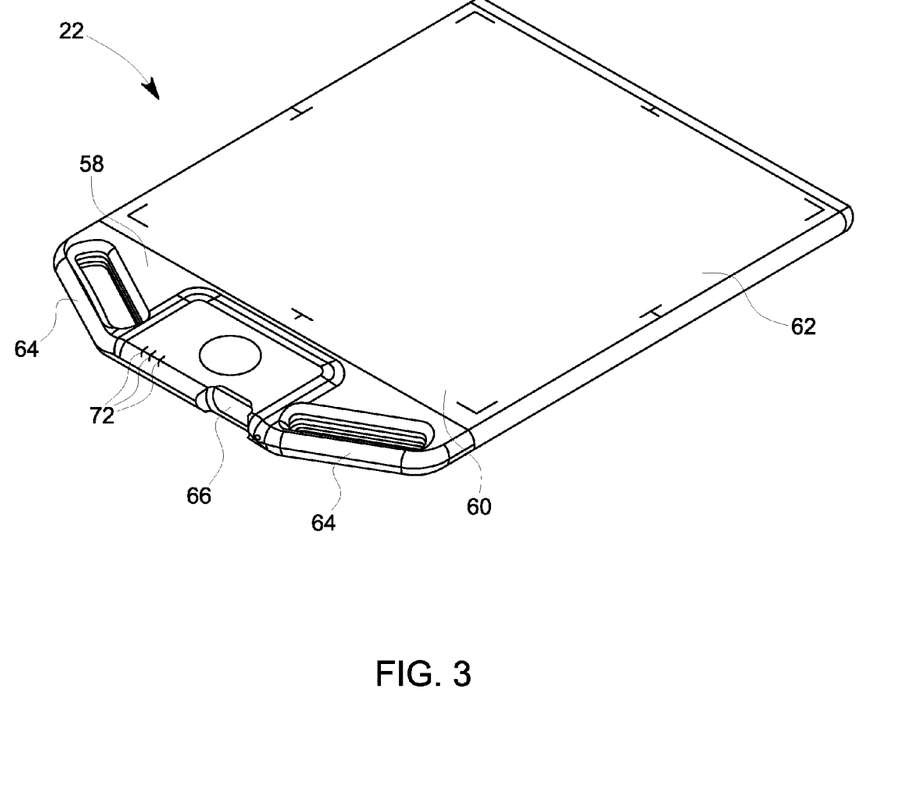
FIG. 3 is a perspective view of the digital detector of FIG. 2, in accordance with aspects of the present disclosure.

One example of an embodiment of a digital detector 22 is generally illustrated in FIG. 3. In the illustrated embodiment, the detector 22 may include a housing 58 that encloses various components of the detector 22. In certain embodiments, the housing 58 includes a window 60 that exposes a surface of the solid-state detector array 62 on which radiation is directed during use. As discussed above, when in use, the detector array 62 may be configured to receive electromagnetic radiation, such as from the radiation source 12, and to convert the radiation into electrical signals that may be interpreted by the imaging system 10 to output an image of an object or patient 18. The housing 58 may include one or more handles 64 that facilitate positioning and transport of the detector 22 by a technician or other user.

As discussed herein, the housing 58 may have a multi-layer construction in which one or more of the layers provide structural stability, electromagnetic shielding, improves damage resistance, and/or reduces the likelihood of damage to the susceptible electronics in the event that the housing 58 is damaged. For example, the housing 58 may have a two-layer or three-layer construction in which one of the layers acts to maintain the integrity of the housing structure in the event the housing 58 is broken or breached such that electronics within the housing 58 are not exposed despite a break within the housing 58. For example, the structural integrity layer may act to keep pieces of the other layer or layers together in the event that other layer is broken or otherwise damaged. In certain embodiments the structural integrity layer, as discussed herein, may include an insert molded metal mesh or metal plating (such as a copper, brass, or aluminum mesh or plating). In embodiments in which a mesh is employed, the plastic layer and mesh layer may be molded or melted to conform to the curvature of different portions of the housing, such as the curvature present near the edges and/or around the handles.

In one embodiment, operating power may be provided to the digital detector 22 via a connector 66 (e.g., receptacle) configured to engage either a removable battery or a cable (e.g., a tether). The digital detector 22 may communicate with one or more other components of the imaging system 10, such as the system controller 28, via a wireless transceiver. Additionally, the digital detector 22 may also communicate data over a wired connection, such as via a tether coupled to the digital detector 22 by way of the connector 66, or via another cable coupled to a docking connector provided elsewhere on the digital detector 22.

Still further, in one embodiment, the digital detector 22 may include a memory device. Among other things, the memory device may store image or X-ray attenuation data acquired via the detector array 62. Additionally, in some embodiments, the housing 58 may include various indicators 72, such as light-emitting diodes, that communicate detector power, status, operation, or the like to a user.

Figure 4:
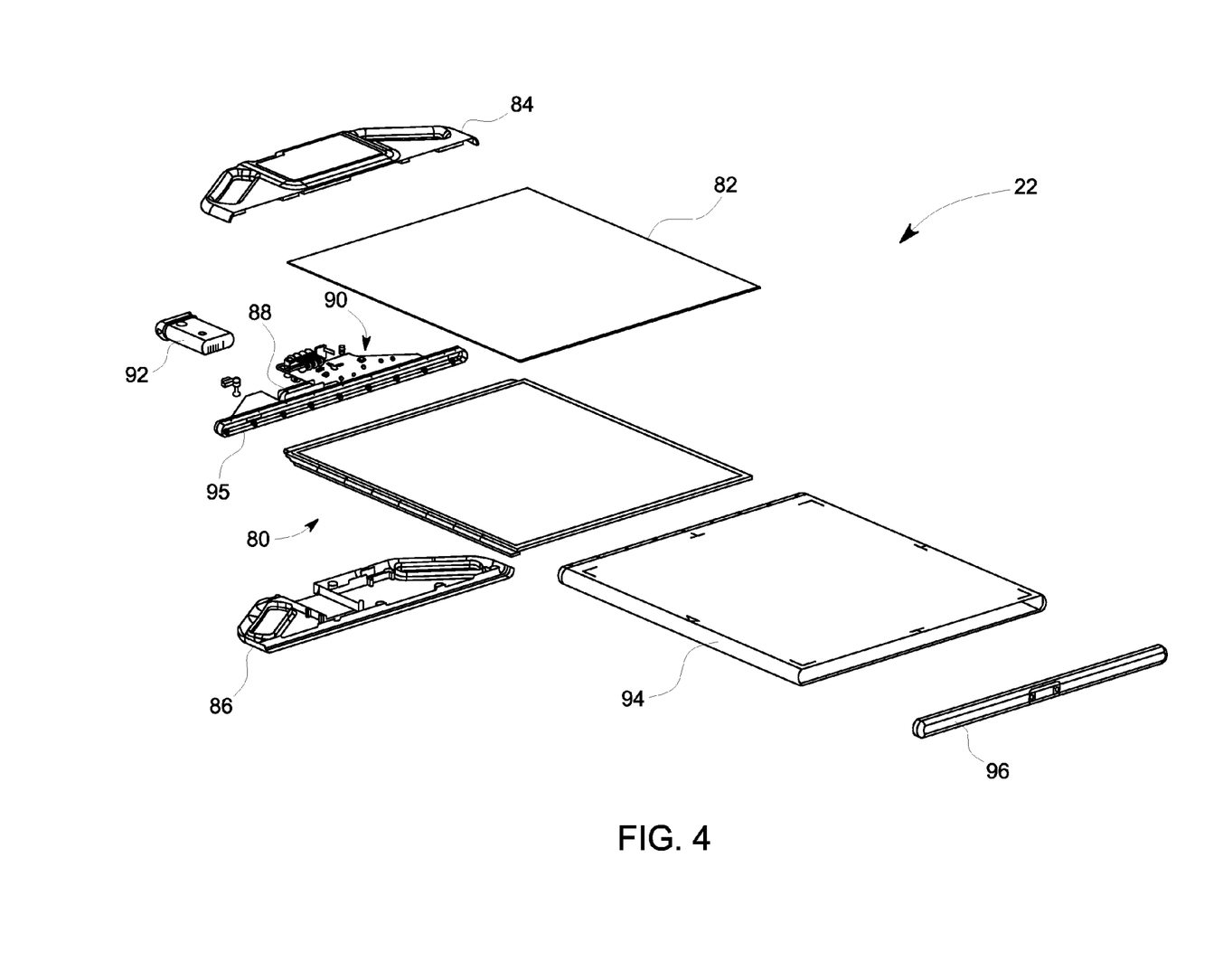
FIG. 4 is an exploded perspective view of the portable digital X-ray detector, as shown in FIG. 3, in accordance with one embodiment.

FIG. 4 illustrates an exploded view of the digital detector 22. The illustrated digital detector 22 of FIG. 4 may include a detector panel 80 and front shock absorbing structure 82. Further illustrated are some components of the handle portion 64 of the housing 58, including a handle top 84, a handle bottom 86, power connector 88, and electronics 90. Operating power may be provided to the digital detector 22 via the power connector 88 configured to engage either of a removable battery 92 or a cable (e.g., a tether). Also illustrated are a shell 94 in which the detector panel 80 is inserted and an end cap 96 that covers an end of the shell 94. As will be appreciated, the housing 58 may encompass some or all of the handle portion 64, shell 94 and/or end cap 96, as well as other components discussed herein that are disposed about the detector panel 80 and that may have an externally exposed surface.

The internal electronics 90 of the digital detector 22 may be susceptible to electromagnetic interference (EMI) from external electronic devices, and such external devices may also be affected by the electronic noise generated by the internal electronics of the digital detector 22. In some embodiments, one or more layers of the housing 58 may form an electrically conductive covering around all or part of the detector panel 80 to reduce or eliminate the effects of such EMI on the digital detector 22 or on external components. For example, in certain embodiments, the handle assembly 64, including one or more of the handle top 84, handle bottom 86, power connector 88, and/or electronics 90 may cover an upper open end of a shell 94 and form a first conductive end cap 95 of the housing 58. A second conductive end cap 96 may cover the lower open end of the shell 94 in one such embodiment. The conductive end caps, in embodiments where in which they are portions of the housing 58, may be formed of multiple layers, at least one of which is conductive, such as of copper, nickel, and/or other conductive metals, and which provides a reduction or elimination of EMI.

Figure 5:
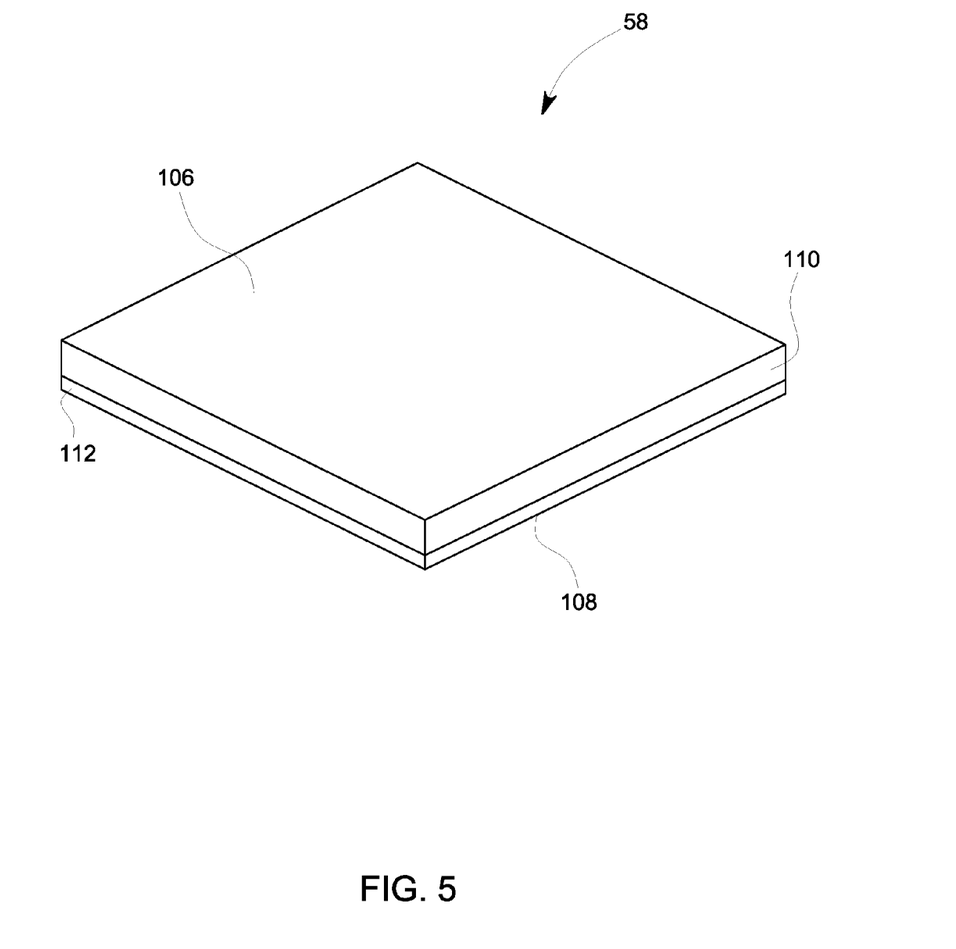
FIG. 5 is a cross section view of a two layer material used in the construction of a housing of the digital detector of FIG. 3 in accordance with one embodiment.

With the foregoing discussion in mind, FIG. 5 illustrates a cross section view of a housing 58 of a portable digital X-ray detector 22 in accordance with one embodiment. As will be appreciated, the term housing 58 is used broadly herein to include many of the non-detector panel components discussed previously, such as, the handles 64, handle top 84, handle bottom 86, end cap 95, shell 94, and/or end cap 96. Referring to FIG. 5, an exterior surface 106 of the housing 58 is the surface of the housing 58 that normally comes into contact with users of the digital detector 22 and with other objects external to the digital detector 22. Conversely, an interior surface 108 is the inward facing surface of the housing 58 that is generally opposite to the exterior surface 106 and/or is generally exposed to the external environment.

In the depicted embodiment, the housing 58 has a first layer 110 and a second layer 112 in which the first layer 110 forms the exterior surface 106 of the housing 58 and the second layer 112 forms the interior surface 108 and provides structural integrity to the first layer 110. As discussed below, other embodiments may have more than two layers, such as three, four, or five layers that combined create the housing 58. While the first layer 110 is depicted as being thicker than the second layer 112, in other embodiments the second layer 112 may have a greater thickness than the first layer 110 or the layers may be of substantially equal thickness.

In one embodiment, the first layer 110 may be formed using polycarbonate, polypropylene terephthalate (PPT), or any suitable thermoplastic or thermosetting resin. For example, the first layer 110 may be composed of a chemically resistant, biocompatible plastic in one embodiment. In other embodiments, the first layer 110 may be composed of any suitable polymer, rubber, or other appropriate material. In one embodiment, in which the first layer 110 is formed using a suitable thermoplastic or thermosetting resin, the first layer 110 is formed to be approximately three millimeters thick. In other embodiments, the thickness of the first layer 110 when formed using such compositions may be two, four, or five millimeters.

The second layer 112 may be formed or provided in different ways and may have different compositions and/or thicknesses. For example, in one embodiment, the second layer 112 is composed of a contiguous or intermittent layer nickel and has a thickness measured in angstroms. In other embodiments the second layer may be formed using aluminum, silver, gold, or copper or a metal alloy, such as brass and may be deposited as a contiguous or intermittent layer. In other embodiments, instead of a deposited layer of material, the second layer 112 may be provided as plating or a mesh (such as a metallic plates or mesh) that may be separable from or molded to (such as insert molded) the first layer 110. In general, the second layer 112 may be composed of a variety of suitable materials, such as metal, rubber, polymer, mesh structure, tape, or other material suitable, that provides the desired structural support and/or integrity and which may also provide some degree of electromagnetic shielding.

The second layer 112 may be formed with or proximate to the first layer 110 in a variety of ways. For example, in one implementation, the second layer 112 is deposited on the first layer 110 using a suitable deposition technique, such as sputtering, chemical vapor deposition, or physical vapor deposition. In other embodiments, the second layer 112 may glued or adhered to the first layer 110. In further embodiments, the second layer 112 may be melted onto or in the first layer 110 or may be insert molded to the first layer 110.

In embodiments in which the second layer 112 is not a metal or metal alloy, the second layer 112 may be provided as a conformal rubber coating. For example, the first layer 110 may be a molded hard plastic forming an externally facing portion of the housing 58. In such an embodiment, the second layer 112 may be a conformable rubber molded on the hard plastic first layer. In addition, in such an embodiment, the respective portion of the housing 58 may be formed using a suitable co-molding technique. In other embodiments in which the second layer 112 is not a metal or metal alloy, the second layer 112 may be provided as a layer of tape or other adhered material that provides the desired structural support and integrity properties.

In one embodiment, the second layer 112 provides structural integrity to the first layer 110 in the event that the first layer 110 is broken or breached. For example, the second layer 112 may support or hold together the material of the first layer 110 so as to reduce or minimize damage to the digital detector 22 in cases where the digital detector 22 is dropped or an object is dropped on the digital detector 22 and the first layer 110 is cracked or otherwise broken. Similarly, the second layer 112 may prevent pieces of the first layer 110 from contacting or damaging the digital detector 22 electronic components in the event that the first layer 110 is broken or cracked.

Figure 6:
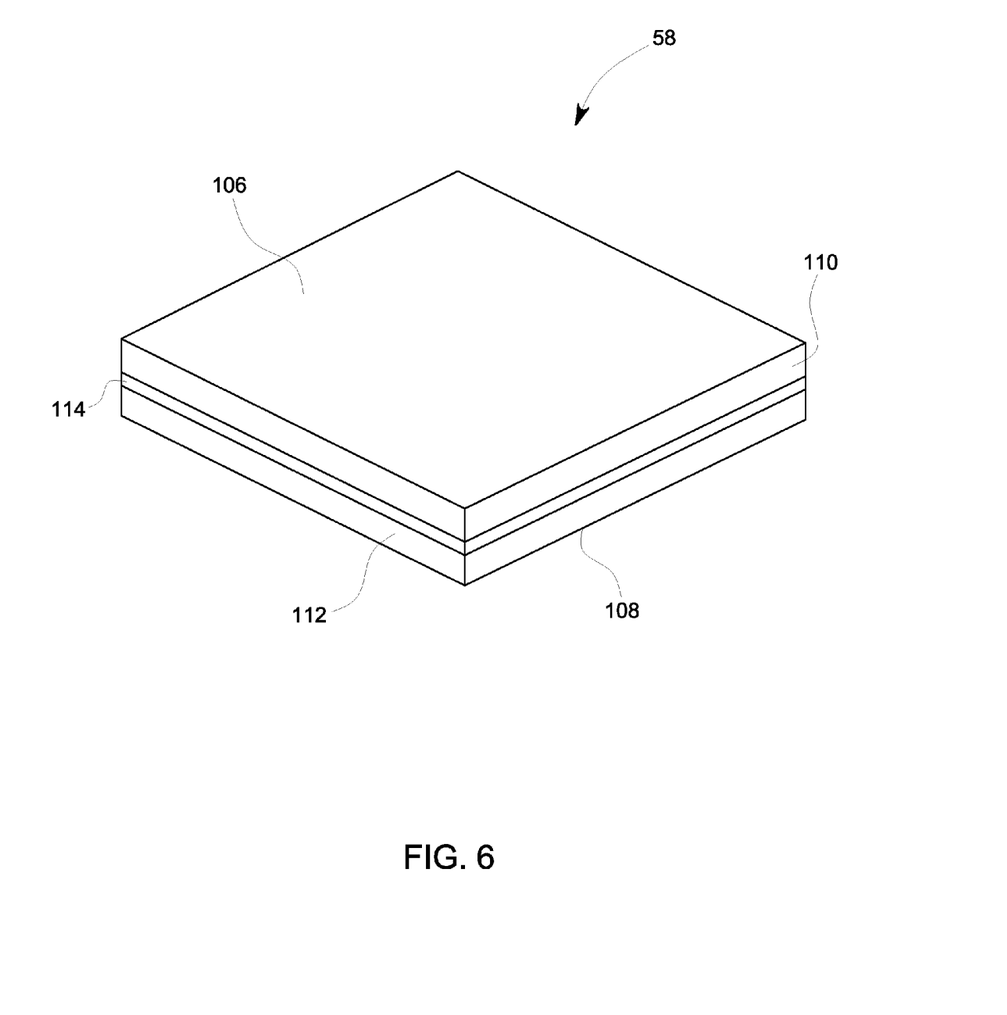
FIG. 6 is a cross section view of a three layer material used in the construction of a housing of the digital detector of FIG. 3 in accordance with one embodiment.

FIG. 6 shows a cross section view of an embodiment of a housing 58 having three layers, a first layer 110, a second layer 112 and a third layer 114. Consistent with FIG. 5, the first layer is depicted as forming the exterior surface 106 and the second layer 112 is depicted as forming the interior surface 108. In the depicted embodiment, however, a third layer 114 is provided intermediate between the first layer 110 and second layer 112.

In one embodiment, the second layer 112 and third layer 114 may both be sputtered and/or deposited layers of metal. For example, interior-facing second layer 112 may be a layer of nickel (or other corrosion resistant metal) a few angstroms thick formed using physical or chemical vapor deposition. The intermediate third layer 114 in such an embodiment may be a layer of copper also formed using physical or chemical vapor deposition on the first layer 110, which may be a hard plastic molded part of the housing 58, such as a suitable thermoplastic or thermosetting resin part. In other embodiments, the respective layers of copper and nickel may be switched such that copper is used to form the interior facing second layer 112 and nickel is used to form the intermediate third layer 114. As will be appreciated, other metals, metal alloys, and/or deposition or placement techniques may be employed to form the respective layers. Likewise, metallic meshes or plates, as discussed with respect to FIG. 5, may be used to form one or both of the second layer 112 and/or third layer 114, as discussed herein, so as to provide the desired structural support and integrity and/or to provide a degree of electromagnetic shielding. Further, in certain embodiments, the second layer forming the interior surface of the housing 58 may be a thermoplastic material or resin as with the first layer 110. In such an embodiment, the intermediate third layer may be an inserted or insert molded layer, such as a metallic plate or metallic mesh layer adding structural stability to the polymeric composition on either side.

To demonstrate how the second layer 112 and/or third layer 114 of housing 58 may provide structural support, FIGS. 7-12 show various embodiments, and illustrate how different layers of the housing 58 may maintain structural integrity of other layers of the housing 58. As depicted in these example, even when cracks or breaks occur in a layer of the housing 58 (e.g., exterior layer 110), the broken pieces of the layer may be held in place by one or more other layers (e.g., interior layer 112 and/or intermediate layer 114). In this way, the electronic of the digital detector 22 are not exposed even when the housing 58 is damaged. Likewise, any loose pieces of the damaged layer are held in place and are not loose within the housing 58, where they might damage the electronics of the digital detector 22

Figure 7:
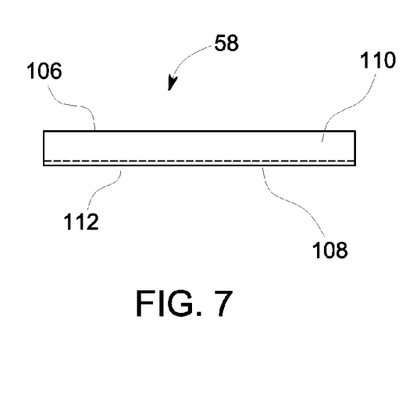
FIG. 7 is a view of the two layer housing of FIG. 5 in accordance with one embodiment.
Figure 8:
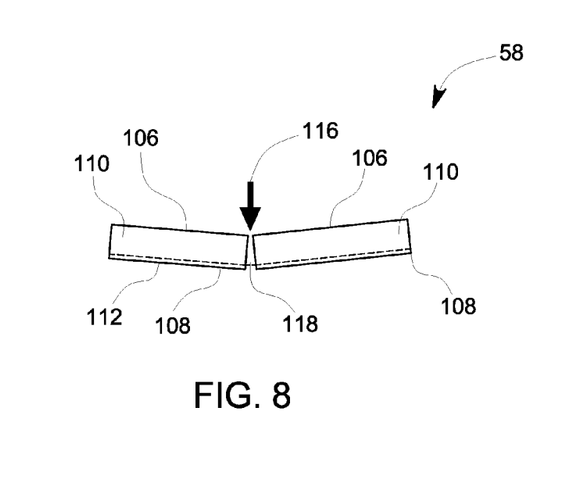
FIG. 8 is a view of a break in one layer of the two layer housing of FIG. 5 in accordance with one embodiment.

By way of example and turning now to FIGS. 7 and 8, a view of a two-layer housing 58 is shown, as depicted in FIG. 5 in accordance with one embodiment. The housing 58 includes the exterior surface 106, the interior surface 108, the first layer 110, and the second layer 112. The first layer 110 may be composed of a polymeric composition. The second layer 112 may be composed of a mesh structure, a plate or plating structure, or a deposited metal or metallic alloy layer. These figures show how the second layer 112 may be constructed to maintain the integrity of the first layer 110 in the event of a break in the first layer 110. In particular, as depicted in FIG. 8, a break 118 in the first layer 110 may result due to an applied force 116 impacting the exterior surface 106. As depicted, the applied force may cause a break 118 in the first layer 110 (e.g., a hard plastic layer) but does not cause a corresponding breaks in the second layer 112 (e.g., the metallic mesh, plate, or deposited layer. Thus, even though the break 118 occurs, the second layer 112 provides structural integrity to keep the broken first layer 110 in a temporarily usable condition without exposing or damaging electronic equipment that might be located near the interior surface 108.

Figure 9:
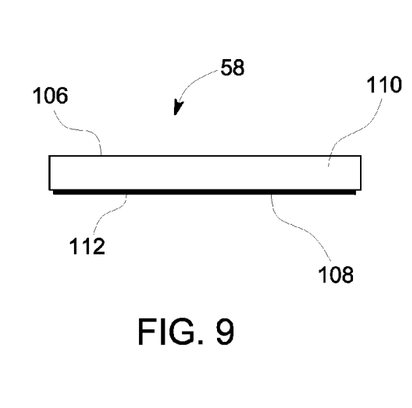
FIG. 9 is a view of the two layer housing of FIG. 5 in accordance with another embodiment.
Figure 10:
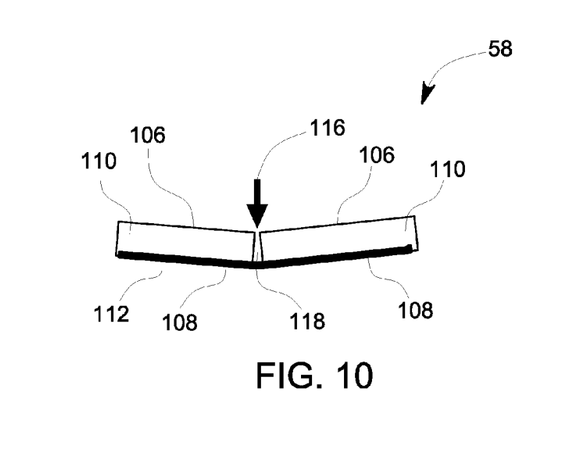
FIG. 10 is a view of a break in one layer of the two layer housing of FIG. 5 in accordance with another embodiment.

Similarly, FIGS. 9 and 10 show views of a different embodiment of a two-layer housing. In this depicted embodiment, the second layer 112 is composed of a rubber or other conformable material. As discussed previously, in one embodiment, the rubber layer is molded onto the first layer or is co-molded with the first layer. As in the previous example, the second layer 112, e.g. rubber, maintains the structural integrity of the first layer 110 in the event of a break 118 in the first layer 110 such that the internal electronics of the detector 22 are not damaged or exposed.

Figure 11:
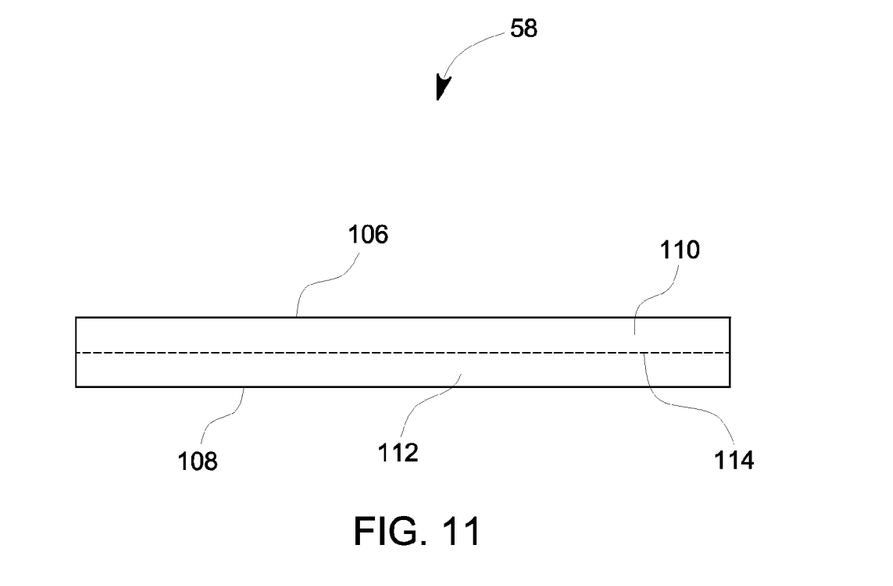
FIG. 11 is a view of the three layer housing of FIG. 6 in accordance with one embodiment.
Figure 12:
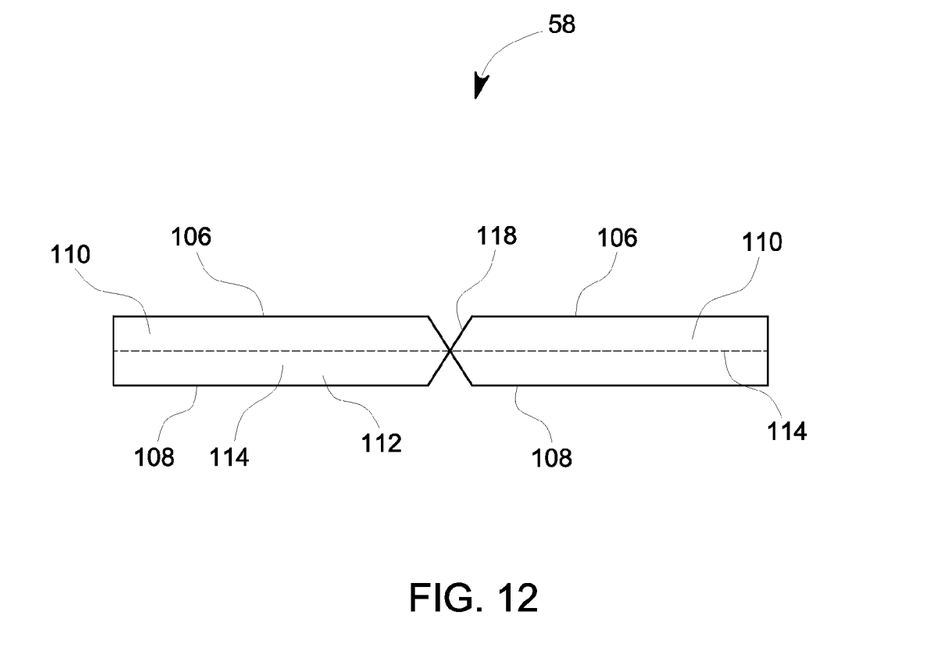
FIG. 12 is a view of a break in two layers of the three layer housing of FIG. 6 in accordance with one embodiment.

Lastly, FIGS. 11 and 12 show views of a housing 58 formed of three-layers, an exterior facing first layer 110, an interior facing second layer 112, and an intermediate third layer 114. For the purpose of this example, both the first layer 110 and the second layer 112 are depicted as being susceptible to breakage (such as due to being formed of polymeric composition) while the intermediate third layer 114 provides structural support for the exterior and interior layers. In other embodiments (not depicted), both the second layer 112 and third layer 114 may be formed of metallic compositions (such as a copper third layer and a nickel second layer) provided as a mesh, plating or deposited layer and thus would not be susceptible to breakage while providing structural integrity to the first layer 110.

As depicted in FIG. 12, a break 118 in two layers of the housing 58 may result from an applied force impacting the exterior surface 106, causing the break 118 to occur in the first layer 110 and in the second layer 112. Even though the break 118 occurs, the third layer 114 provides structural integrity to keep the broken first layer 110 and the broken second layer 112 in a temporarily usable condition without causing a major problem to electronic equipment that might be located near the interior surface 108.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A portable X-ray detector assembly, comprising:
   a detector array;
   a housing configured to house the detector array, the housing comprising at least a first layer and a second layer, wherein the first layer comprises a polymer and the second layer maintains structural integrity of the first layer in the event of a break in the first layer.

2. The detector assembly of claim 1, wherein the second layer comprises a rubber.

3. The detector assembly of claim 1, wherein the second layer comprises a mesh structure.

4. The detector assembly of claim 1, further including a third layer comprising a polymer, wherein the second layer maintains structural integrity of the third layer in the event of a break in the third layer.

5. The detector assembly of claim 1, wherein the second layer comprises a metal or a metallic alloy.

6. The detector assembly of claim 1, further including a third layer comprising nickel, wherein the second layer comprises copper and is connected to the third layer.

7. The detector assembly of claim 1, wherein the second layer shields the detector array from electromagnetic interference.

8. The detector assembly of claim 1, wherein the second layer is formed via one or more of sputtering, chemical vapor deposition, or physical vapor deposition.

9. A method of manufacturing a portable X-ray detector assembly, comprising:
   fabricating a housing comprising at least a first layer and a second layer, wherein the first layer comprises a polymer and the second layer maintains structural integrity of the first layer in the event of a break in the first layer; and
   situating a detector array within the housing.

10. The method of claim 9, wherein the second layer comprises a metal or a metallic alloy.

11. The method of claim 9, wherein fabricating the housing comprises vapor depositing the second layer on the first layer.

12. The method of claim 9, wherein fabricating the housing comprises forming a third layer comprising the polymer, wherein the second layer divides the first layer and the third layer and is formed via insert molding a mesh structure.

13. The method of claim 9, wherein fabricating the housing comprises forming a third layer, wherein the second layer and the third layer are formed from different metals.

14. The method of claim 13, wherein the second layer comprises copper and the third layer comprises nickel.

15. A housing component for a portable X-ray detector, comprising:
    a first layer comprising a polymer; and
    a second layer formed on or in the first layer, wherein the second layer maintains the structural integrity of the first layer in the event of a break in the first layer.

16. The housing component of claim 15, wherein the second layer comprises a mesh structure.

17. The housing component of claim 16, wherein the mesh structure comprises a metallic mesh structure.

18. The housing component of claim 15, wherein the second layer comprises a metal or a metallic alloy.

19. The housing component of claim 15, further including a third layer, wherein one of the second layer and the third layer comprises nickel and the other of the second layer and the third layer comprises copper.

20. The housing component of claim 15, wherein the second layer shields the detector array from electromagnetic interference.

* * * * *